Aug. 26, 1952     H. B. HUGHES     2,608,234
TIRE CHAIN HOLDER
Filed March 6, 1951
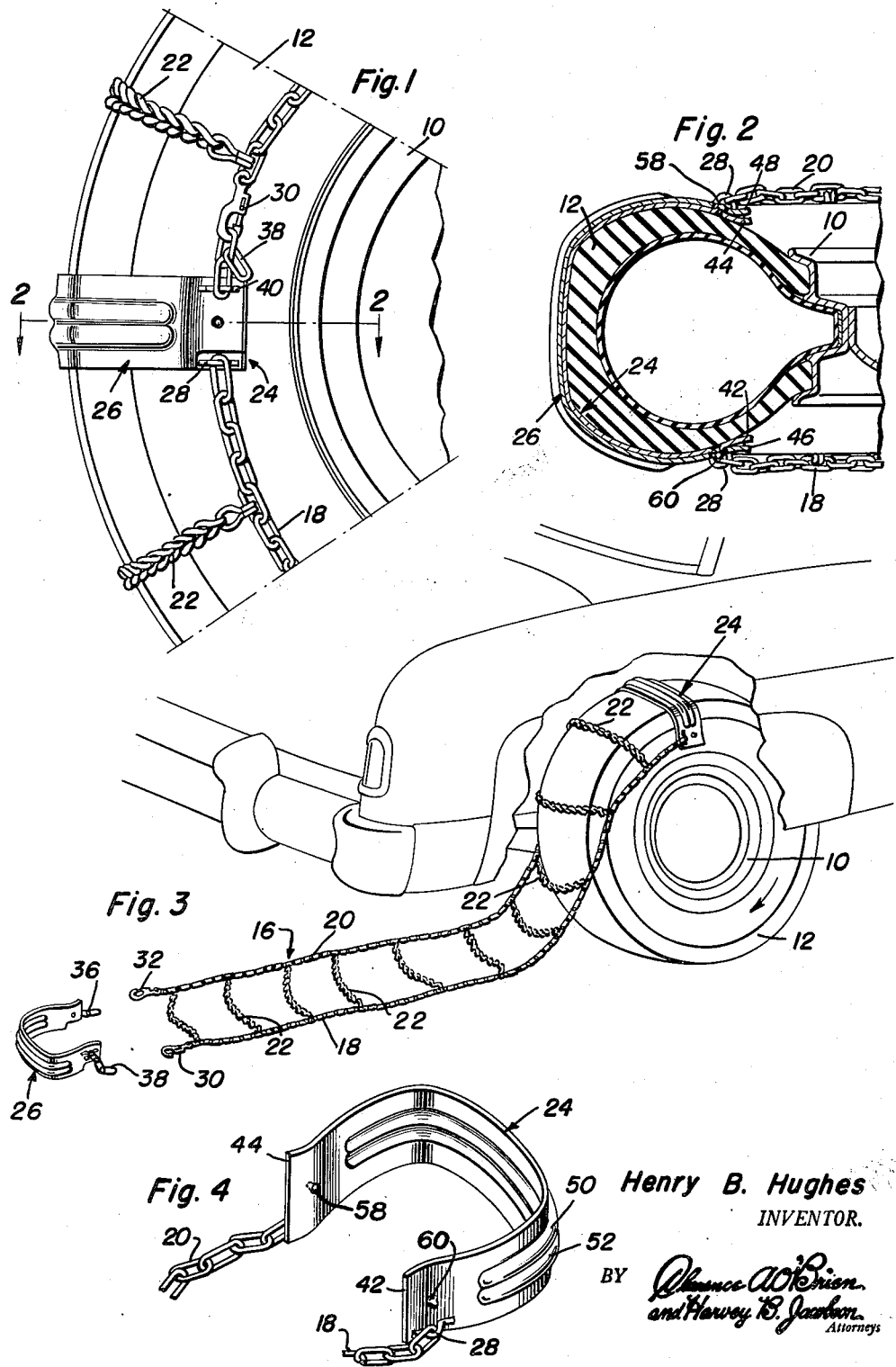
Henry B. Hughes
INVENTOR.

Patented Aug. 26, 1952

2,608,234

UNITED STATES PATENT OFFICE 2,608,234

TIRE CHAIN HOLDER

Henry B. Hughes, Kingsport, Tenn.

Application March 6, 1951, Serial No. 214,118

5 Claims. (Cl. 152—241)

This invention relates to improvements in a combination tire chain and holder for the chain.

An object of this invention is to provide an improved anti-skid device which includes a tire chain and a pair of plates, one plate being secured to one end of the chain and the other plate being secured to the opposite end of the chain, at least one of said plates being of spring material, for example spring steel, in order that it may be snapped on the other plate, holding the other plate in nested relation therewith to facilitate the attachment of an anti-skid chain on the tire of a vehicle.

It is another object of this invention to provide several additional chain links at the point of attachment between the main chain and one of the clamp plates so as to supply adjustment possibilities in the device to compensate for various diameter tires.

Another object of the invention is to supply an additional locking means for the two plates, said locking means including tongues and grooves to prevent relative sliding movement of one plate and the other, at least one of the tongues rising from the outer surface of one of the plates so as to constitute a traction element in addition to the crossed chains of the anti-skid chain.

Ancillary objects and features of importance will become apparent in following the description of the illustrated form of the invention.

In the drawings:

Figure 1 is a fragmentary elevational view of a standard wheel and tire having a part of the assembly located thereon;

Figure 2 is a sectional view taken substantially on the line 2—2 of Figure 1 and in the direction of the arrows;

Figure 3 is a fragmentary view of a vehicle having the chain device partially connected therewith; and Figure 4 is a perspective view of one of the clamping plates.

In the drawings there is illustrated a fragmentary part of a wheel 10 and a fragmentary part of a standard tire 12 disposed on the wheel. As is usual, the anti-skid device is applied to the rear wheels of a vehicle, whether it is a truck, automobile, bus or the like. The anti-skid device comprises a chain 16 which includes side chain members 18 and 20 connected together by means of cross links 22, the cross links being located at spaced intervals on the side members 18 and 20.

The holder for the chain 16 comprises a first plate 24 and a second plate 26, both plates being substantially U-shaped in cross section. The first plate is adapted to rest upon the tread and side walls of a tire and is preferably of a spring material, as spring steel, so that it frictionally clamps upon the side walls and tread of the tire. The second plate is of the same configuration as the first plate 24 but is slightly larger in order that it may fit over the first plate 24. The material of the second plate is the same as the material of the first plate 24.

One end of the chain 16 is fastened to the lower first plate 24, there being two brackets 28 fastened to the outer surface of the clamp plate 24 near one side edge thereof and links of the side members 18 and 20 being carried by the brackets 28. The opposite end of the chain 16 is provided with standard spring loaded fasteners 30 and 32 which are removably connected with any one of the series 36 and the series 38 of connected links. The series 36 and the series 38 of connected links are fastened to the brackets 40 which are fixed to the outer surface of the outer plate 26 near the ends thereof and near one side edge of it so that the fastening members 30 and 32 may be used in any of the plurality of links 36 and 38. By proper selection of the links in the series 36 and 38 the size of the chain 36 may be varied in order to be used with various size tires.

In operation the outer plate 26 is snapped on the inner plate 28 by pushing the open end of the outer plate over the portion of the inner plate 24 which overlies the tread of the tire. The ends 42 and 44 of the inner plate 28 are flared outwardly slightly and the ends 46 and 48 of the outer plate are also flared outwardly slightly in order to serve a guiding function as they are cammed over the sides of the first plate 24.

The lower plate 24 is first engaged with the tire and then the vehicle is moved causing rotation of the rear wheels thereof. This winds the chain 16 around the tire. The fastening elements 30 and 32 are then connected to the links of the series 36 and 38 and the second plate is pressed on the first plate. Alternatively, the second plate 26 may first be fastened to the outer surface of the lower plate 24 and then the fastening elements 30 and 32 used to connect the chain 16 with the outer plate 26.

Once the plates 24 and 26 are in nested relationship with each other, there would be a possibility of one plate sliding with respect to the other and the chain 16 becoming unfastened from the wheel. To prevent sliding separation of the plate 24 from the plate 26, I have provided tongues and grooves in the plates which are adapted to interfit. The plate 24 has a pair of longitudinal ribs 50 and 52 extending longitudinally thereof, across the outer end of the holder 24 and partially down the sides of the plate. These ribs, constituting tongues, rise outwardly from the outer surface of the holder 24 and are adapted to fit in grooves which are formed in the material of the plate 26. These grooves are made by depressing the material of the outer plate 26 so as to provide external tongues, the external tongues forming traction elements as do the crossed links 22 of the chain 16. In order to insure that there will be no accidental separation of the clamp plates 24 and 26, the lower plate 24 has two inwardly opening recesses 58 and 60 formed therein by punching, whereby lugs rise from the outer surface of the clamp plate 24 near the ends of the legs thereof. Since there are similar recesses provided in the sides of the outer plate 26, the lugs are arranged to be fitted therein thereby releasably clamping the plates 24 and 26 together, the lugs and recesses constituting a part of the tongue-groove assembly to prevent the plates 24 and 26 from sliding off each other.

Having described the invention, what is claimed as new is:

1. In a vehicle anti-skid device, the combination of a tire chain and holder for the chain, said holder comprising a first plate fastened to one end of said chain and being substantially U-shaped to fit over a part of the tread and side walls of a tire, a second plate of spring material which is substantially U-shaped and removably engaging said first plate and holding said first plate nested therewith, and means fastening the opposite end of said chain to said second plate, said plates having tongues and grooves interfitted with each other to prevent relative sliding movement of said plates.

2. The combination of claim 1 and at least one of said tongues extending longitudinally of said second plate and rising from the outer surface thereof to constitute a traction element.

3. In a vehicle anti-skid device, the combination of a tire chain and holder for the chain, said holder comprising a first plate fastened to one end of said chain and being substantially U-shaped to fit over a part of the tread and side walls of a tire, a second plate of spring material which is substantially U-shaped and removably engaging said first plate and holding said first plate nested therewith, and means fastening the opposite end of said chain to said second plate including a pair of brackets secured to said second plate, each bracket having a plurality of links carried thereby to provide adjustment, and said opposite end of said chain being removably connected with a selected link of said plurality of links.

4. In a vehicle anti-skid device, the combination of a tire chain and holder for the chain, said holder comprising a first plate fastened to one end of said chain and being substantially U-shaped to fit over a part of the tread and side walls of a tire, a second plate of spring material which is substantially U-shaped and removably engaging said first plate and holding said first plate nested therewith, and means fastening the opposite end of said chain to said second plate including a pair of brackets secured to said second plate, each bracket having a plurality of links carried thereby to provide adjustment, and said opposite end of said chain being removably connected with a selected link of said plurality of links, said plates being provided with tongues and grooves interfitted with each other to prevent sliding movement of said plates relative to each other.

5. In a vehicle anti-skid device, the combination of a tire chain and holder for the chain, said holder comprising a first plate fastened to one end of said chain and being substantially U-shaped to fit over a part of the tread and side walls of a tire, a second plate of spring material which is substantially U-shaped and removably engaging said first plate and holding said first plate nested therewith, and means fastening the opposite end of said chain to said second plate including a pair of brackets secured to said second plate, each bracket having a plurality of links carried thereby to provide adjustment, and said opposite end of said chain being removably connected with a selected link of said plurality of links, said plates being provided with tongues and grooves interfitted with each other to prevent sliding movement of said plates relative to each other, and at least one of said tongues rising from the outer surface of said second plate to constitute a traction element.

HENRY B. HUGHES.

REFERENCES CITED

The following references are of record in the file of this patent:

UNITED STATES PATENTS

| Number | Name | Date |
|---|---|---|
| 1,661,707 | Small | Mar. 6, 1928 |
| 2,478,335 | Stark | Aug. 9, 1949 |
| 2,484,714 | Kapp | Oct. 11, 1949 |